United States Patent [19]
Andersson

[11] Patent Number: 5,568,387
[45] Date of Patent: Oct. 22, 1996

[54] METHOD AND ARRANGEMENT FOR ADAPTIVE SWITCHING OFF OF THE EXHAUST BRAKE IN CONNECTION WITH UPSHIFT

[75] Inventor: Roger Andersson, Södertälje, Sweden

[73] Assignee: Scania CV Aktiebolag, Sweden

[21] Appl. No.: 365,969

[22] Filed: Dec. 29, 1994

[30] Foreign Application Priority Data

Dec. 30, 1993 [SE] Sweden .................................. 9304366

[51] Int. Cl.$^6$ .............................. G06G 7/70; B60K 41/04
[52] U.S. Cl. ....................... 364/424.1; 477/107; 477/109; 477/70; 477/120; 192/4 A; 192/3.58; 192/51; 74/335; 74/336 R
[58] Field of Search ........................... 364/424.01, 424.1; 477/107, 109, 70, 71, 92, 120, 124, 125, 74, 75, 94, 155, 110; 192/51, 3.58, 4 A, 3.31, 3.3; 74/339, 335, 336 R, 331; 123/321, 323, 90.16

[56] References Cited

U.S. PATENT DOCUMENTS

| | | | |
|---|---|---|---|
| 4,669,435 | 6/1987 | Furusawa et al. ....................... | 123/323 |
| 4,787,044 | 11/1988 | Nagata et al. ..................... | 364/431.07 |
| 4,961,484 | 10/1990 | Kato et al. ............................. | 192/3.31 |
| 4,987,869 | 1/1991 | Hilburger ................................. | 123/323 |
| 5,393,276 | 2/1995 | White et al. ............................. | 477/107 |

Primary Examiner—Kevin J. Teska
Assistant Examiner—Jacques Louis-Jacques
Attorney, Agent, or Firm—Ostrolenk, Faber, Gerb & Soffen, LLP

[57] ABSTRACT

The invention relates to an improved method and an arrangement for implementation of that method for obtaining safer and quicker upshifts while maintaining gear change comfort, using computer-assisted systems for gear change in mechanical gearboxes in motor vehicles, preferably without clutch disengagement between engine and gearbox. In connection with upshift, an exhaust brake is activated, ($EB_{on}$) at time $t_1$ in parallel with the fuel (FUEL) to the engine being reduced to zero quantity. The engine speed $n_2$ is thereby reduced more quickly to the speed $n_1$ which is the synchronous engine speed for the next higher gear. The speed reduction is monitored with a view to achieving rapid engine speed bracketing to synchronous speed, and also good gear change smoothness and safe gear engagement. The exhaust brake switch-off point $EB_{off}$ at time $t_2$ is adjusted adaptively for subsequent upshift by a connection factor $EBA_{off}$ so that the engine speed falls to a level Maxdip within a predetermined speed range below the synchronous engine speed, preferably between 15 and 50 rpm below the synchronous speed.

12 Claims, 4 Drawing Sheets

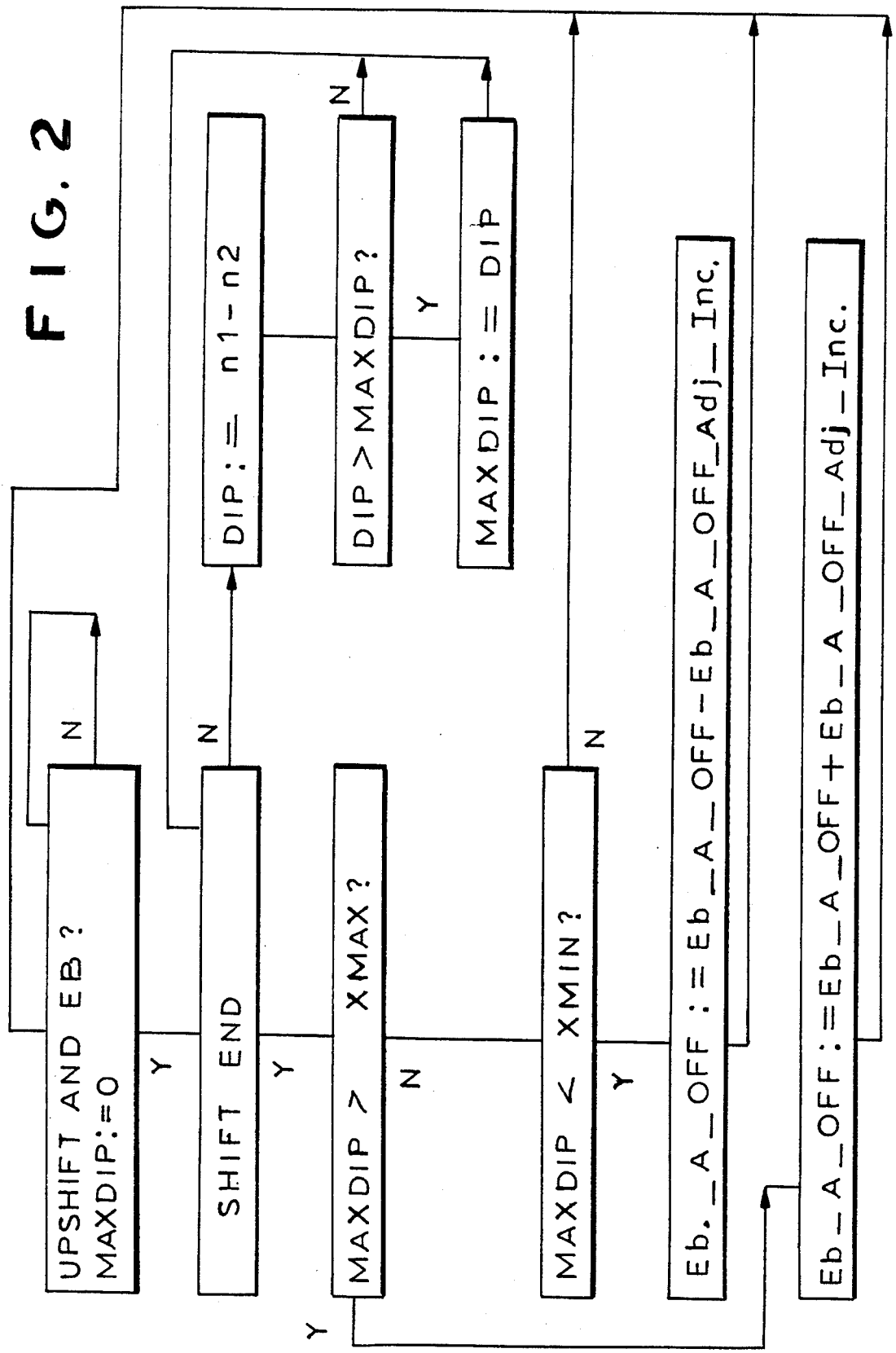

METHOD AND ARRANGEMENT FOR ADAPTIVE SWITCHING OFF OF THE EXHAUST BRAKE IN CONNECTION WITH UPSHIFT

BACKGROUND OF THE INVENTION

The invention relates to a method and arrangement for computer assisted upshifting in motor vehicles.

When motor vehicle gearboxes shift to higher gears which have lower gear ratios, the engine speed drops. In semi-automatic and fully automatic gear change systems, preferably for mechanical stepped gearboxes, the engine speed is then adjusted by adjustment of the fuel quantity injected, and if the engine speed would drop at the time of upshift an exhaust brake may also be activated momentarily during the gear change so that the engine speed drops more quickly to a speed which is synchronous with the speed of the next gear.

U.S. Pat. No. 4787044 describes a solution whereby the exhaust brake is activated during the course of upshift so that the engine speed comes down more quickly to a speed synchronous with the next gear. However, that solution uses an automated clutch function which disengages the engine from the gearbox, after which fuel adjustment and exhaust brake activation take place at the time of upshift in order to come down quickly to synchronous speed. Since the clutch disengages, the achievement of synchronous speed is not so critical, since the clutch can accommodate remaining speed differences during its re-engagement, by frictional absorption. This means that each upshift can take place with exhaust brake activation resulting in an approximately synchronous speed, and any remaining speed differences after exhaust brake adjustment are adjusted by the fuel and/or are absorbed in the clutch when it re-engages.

SUMMARY OF THE INVENTION

One object of the invention is to provide a greater degree of comfort, with minimum noise generation, in automated gear changing in motor vehicles with mechanical stepped gearboxes.

Another object is to facilitate gear changing without using the clutch. A further object is to provide quicker upshifts whereby the next higher gear can be engaged early because synchronous speed is reached earlier and at a predetermined point during the course of the gear change.

A yet further object is to achieve more reliable upshifts whereby gears are not prevented from engaging because of great speed differences and consequent positive or negative torque in the gearbox.

One object in a more developed embodiment is to achieve adaptation of exhaust brake activation individually to each engine-and-gearbox combination, which adaptation is applied during continuous operation as well as after starting up the vehicle.

A further object in a more developed embodiment is that for exhaust brake activation during upshift there should be no need to use any feedback from the position of the exhaust manifold valve by means of manifold valve position sensor etc.

Another object in a more developed embodiment is to achieve an optimum pattern of engine speed bracketing to synchronous speed. The foregoing and other objects are accomplished in accordance with the present invention by a computer assisted method and arrangement for controlling an upshift from a lower gear to a higher gear in a motor vehicle having an exhaust brake which is activated to lower the engine speed to a speed which synchronized with the higher gear. In accordance with the invention, the exhaust brake is activated during the upshift and is deactivated at a predetermined time after activation. The engine speed is then determined and compared with the synchronized speed required for the higher gear. A determination is then made in accordance with predetermined criteria whether the predetermined time for deactivation of the exhaust brake for the next shift to a higher gear should be changed and, if so, the predetermined time is changed so that during the next shift to a higher gear the exhaust brake is deactivated at the new predetermined time.

Other features distinguishing the invention are indicated by the subordinate claims and by the description hereinafter of an embodiment with reference to the figures listed below.

BRIEF DESCRIPTION OF THE DRAWINGS

FIG. 2 shows a flow diagram of how the control unit adaptively optimises the time of switching off the exhaust brake in the course of upshift.

DESCRIPTION OF THE PREFERRED EMBODIMENT(S)

Figure 1:
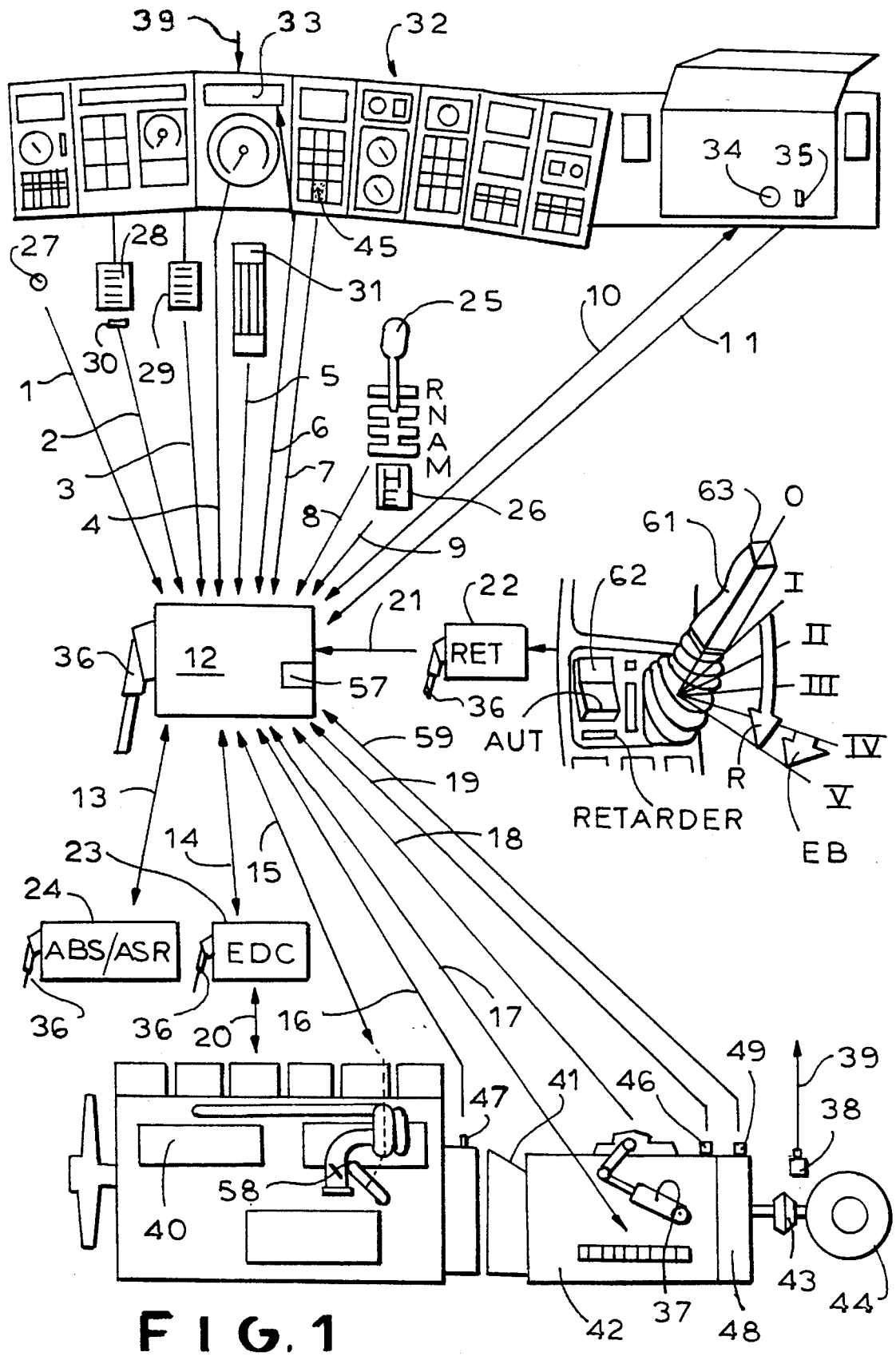
FIG. 1 depicts schematically the composition of a gear change system for mechanical stepped gearboxes.

FIG. 1 depicts a gear change system for monitoring and control of the computer-assisted operation of mechanical gearboxes in a motor vehicle. The vehicle is powered by a combustion engine 40, preferably a diesel engine, which via a clutch 41 operated by the driver can transmit driving power to the vehicle's driving wheels 44 via a mechanical stepped gearbox 42 and propeller shaft 43. The gearbox 42 preferably incorporates an integrated retarder 48 with which an adjustable retarder braking effect can be exerted on the driveline with the object of achieving a high braking effect on the vehicle without using the vehicle's ordinary wheel brakes. The gear change system in this embodiment incorporates a manually operated clutch servo for starting and stopping, with no automatic clutch servo, but the invention may also be applied in systems with automated clutch.

The gear change system executes gear changes by adjusting the engine speed and the engine torque in the course of gear changes and by operating the servo which disengages the current gear and engages the next gear without disengaging the clutch 41. The result is high demands on the engine control arrangements and with regard to the speed information which the system requires for the engine control arrangements to facilitate the torque-free disengagement of a gear, and for quickly achieving, by means of the engine control arrangements only, the synchronous speed for the next gear, which has to be engaged with the shortest possible torque break in the mechanical stepped gearbox.

Mechanical stepped gearboxes, preferably with or without conventional synchronising arrangements in the gearbox, are from many points of view a considerably more advantageous choice than conventional hydraulic automatic gearboxes which change gear without torque break or than mechanical gearboxes with complicated double clutches which have to provide gear changing without torque break. This is particularly so from the cost point of view as regards operating economy, servicing and purchase cost. If the stepped gearbox also incorporates conventional synchronisations, the result is also increased operating safety in that manual gear changing or semi-automatic gear changing, i.e. servo-assisted disengagement and engagement of gears as a consequence of manual clutch disengagement, can be performed if the automated gear change function is eliminated by system failure, while maintaining a high degree of gear change comfort.

The gear change system incorporates a control unit 12 with microcomputer which is connected by various signal lines 36 to control units for the fuel system 23, the retarder system 22 and the vehicle brake system 24. These signal lines convey to the control unit 12 various signals corresponding to the signals 1–11, 13–19, 21 and 59 represented by arrows in FIG. 1.

The control unit 12 receives the following input signals:

Signal 1 from a brake program contact 27 which is situated accessibly for foot operation by the driver. The brake program contact acts on the retarder function via the control unit 22 but also on the gear change points of the gear change system when the brake program contact is activated.

Signal 2 from a clutch contact 30 which detects the position of the clutch pedal.

Signal 3 from the vehicle foot brake pedal, indicating the position of the brake pedal.

Signal 4 from the vehicle's tachometer, with secondary information on the vehicle's road speed or propeller shaft speed.

Signal 5 from the vehicle's accelerator pedal, indicating the current position of the accelerator pedal.

Signal 7 from an exhaust brake actuator 45 situated on an instrument panel 32.

Signal 8 from the gear lever, indicating the gear change system operating state chosen by the driver, either in automatic position A, neutral position N, manual position M or reversing R, and any corrections made by the driver to the automatically selected gear in automatic position A or to a new gear selection in any manual position N,M,R.

Signal 9 from a driving program selector 26 whereby the driver can select, for example, economy program E, which gives gear change points with optimum fuel economy and gentle gear changes, or hill program H whereby the gear change points are set so as to provide maximum tractive force and give rapidity of gear change priority over comfort and quietness.

Signal 11 from a diagnostic selector 35 by which a test program incorporated in the software of the control unit can be activated for servicing or fault location by means of fault signalling on the instrument panel information field 33.

Signal 21 from the retarder control unit 22 which modifies the gear change points whenever the signal from the retarder function is activated so as to provide increased engine brake effect and coolant flow.

Signal 19 from an speed sensor situated on the output shaft of the gearbox 42, preferably the propeller shaft 43.

Signal 18 from gear sensors in the gearbox 42 which indicate which gear is engaged.

Signal 16 from a speed sensor situated on the input shaft of the gearbox 42, preferably on the engine's crankshaft or flywheel.

Signal 59 from a temperature sensor 49 which detects the temperature of the cooling water leaving the retarder.

The control unit 12 adjusts various servos or lights up information fields on the instrument panel 32 by the following output signals:

Signal 6 is directed to an information field 33 on the instrument panel 32 which indicates to the driver the gear change system operating state (A,N,M,R), current gear, next gear, driving program (E,H) and any fault codes, warnings and other information.

Signal 17 is directed to various solenoids in the gearbox which activate servos for operating gear change carriers so that gears can be withdrawn and inserted.

Signal 15 is directed to the exhaust brake 58 situated in the engine's exhaust system so that the exhaust brake in addition to its function as a supplementary brake can be activated to reduce the engine speed quickly to synchronous speed, particularly when changing up to gears with lower gear ratios.

The control unit 12 is also in two-way communication in that it transmits output signals to and receives input signals from a number of control units via the following links:

Link 10 connected to the diagnostic socket 34 whereby diagnostic equipment can tap fault codes from the control unit 12 and carry out software testing of the functioning of the control unit.

Link 13 connected to the control unit for the antilocking function (ABS) and antiskid function (ASR) of the brakes whereby the brake control unit may inter alia prevent gear changes when the ASR function is active.

Link 14 connected to the fuel system control unit 23 which in its turn, via link 20, adjusts the fuel quantity at the injectors of the combustion engine.

In the system indicated above, gear changing in the A position of the gear lever takes place automatically according to the engine parameters detected, such as vehicle speed, engine load and speed, and the derivatives of one or more of the factors vehicle speed/accelerator position/engine speed, if the accelerator pedal is fully depressed (so-called kickdown) and if braking takes place. Gear changing is performed automatically so as to achieve optimum fuel consumption and performance.

The retarder control unit 22 incorporates a manual control 61 which is preferably situated on the instrument panel 32. This control may be placed in a number of positions O–V, whereby the initial position 0 causes; the retarder 48 to be disconnected and the positions I,II,III,IV and V cause a progressive increase in the braking effect of the retarder. Position I can produce a braking torque of 500 Nm, position II of 1000 Nm, position III of 1500 Nm, position IV of 2000 Nm and position V the maximum retarder braking effect of approximately 3000 Nm. It is advantageous for this latter braking effect step V to incorporate also simultaneous activation of the vehicle's exhaust brake 58/EB, thereby further increasing the braking effect on the vehicle's driving wheels. Positions O–V are stable, so the lever remains in the respective position if the driver releases the lever. The retarder function, however, always ceases as soon as the driver operates the vehicle's accelerator pedal 31, but the braking effect of the retarder comes in automatically as soon as the accelerator pedal is released when the control is in any of the positions I–V.

The retarder function may also operate as a constant speed maintenance function depending on operation of the brake pedal or of a button 63 on the control 61. The retarder's braking effect is then adjusted automatically so as to endeavour to maintain the vehicle's speed by progressively increasing the braking effect if the vehicle's speed increases. The button 62 may be used to bring this constant speed maintenance function in automatically upon activation of the brake pedal 29 and to keep it activated until the next time the accelerator pedal is operated.

The invention is applied with advantage to automatic gear changing in mechanical stepped gearboxes in which gear changing takes place without disengaging the clutch 41. The invention may also be applied to gear changing by automatic hydraulic gearboxes, but the advantages to be gained are not as obvious in such gearboxes, since gear changing mainly takes place without torque break, and a certain slippage is absorbed in the gearbox at the moment of changing gear, which slippage compensates for any speed differences there may be between the previous gear and the next higher gear.

The invention is described in more detail with reference to FIG. 2, which depicts a flow diagram for an adaptive control routine for adjustment of the exhaust brake switch-off point during gear changes. The control routine is stored in the microcomputer of the control unit 12. The flow diagram is described with reference to the sequence diagrams in FIGS. 3A–3B and FIGS. 4A–4B, which respectively depict the engine speed ERPM and the status of the exhaust brake (EB STATUS) and the fuel control (FUEL) during the course of a gear change.

Interrogation step 90 detects the ordering by the control unit 12 of an upshift with activated engine brake EB (Exhaust Brake), and simultaneously zeroes a control parameter Maxdip. The control parameter Maxdip is a parameter which is given, during each gear change with activated exhaust brake, a new value depending on the extent to which the adjusted engine speed is less than the synchronous speed of the next gear. So long as the answer is negative (N), i.e. gear changing with activated exhaust brake is not ordered, no further step is activated.

If a gear change with activated exhaust brake is ordered at time $t_1$ in FIGS. 3A–3B and FIGS. 4A–4B and the answer at interrogator step 90 is positive (Y), the control routine goes on to interrogator step 91, which detects whether the gear change has been completed. So long as the gear change is proceeding, there is activation of steps 92–94, which may update the control parameter Maxdip.

Step 92 calculates the speed difference Dip as the synchronous engine speed for the next gear $n_1$ minus the current engine speed $n_2$. If the current speed $n_2$ is, for example, 1800 rpm for the previously engaged gear and the synchronous engine speed for the next gear $n_1$ is approximately 1500 rpm, the parameter Dip will be negative during the initial stage of the upshift so long as the engine speed is falling and remains higher than the synchronous engine speed for the next gear.

Interrogator step 93 checks whether the current speed difference Dip exceeds the set-value for Maxdip, which is zero at the beginning of the upshift, by zeroing step 90. So long as Dip is negative there is no updating of Maxdip, Maxdip receives its set zero value or value set from previous upshifts, and step 91 is reverted to.

Steps 91-92-93 are run through continuously during the course of a gear change, and as soon as the engine speed $n_2$ falls below the synchronous speed for the next gear $n_1$, Dip will become positive, and if Dip becomes greater than the control parameter Maxdip the control routine goes on to step 94, which updates the control parameter Maxdip. So long as the engine speed is falling, the gear change has not been completed and Dip is increasing or becoming greater than the latest control parameter Maxdip stored, steps 91-92-93-94 will be run through and the control parameter Maxdip be set at the maximum speed dip below the synchronous speed $n_1$ for the next gear.

When the gear change is completed, which can advantageously be detected by the gear change sensors in the gearbox, the control routine leaves step 91 and goes on to interrogator step 95. Interrogator step 95 does a comparison to see whether the control parameter Maxdip exceeds an upper permitted threshold value Xmax. It is advantageous for the threshold value Xmax to be a predetermined constant speed difference independent of the gear step and of the magnitude of the gear step. It is advantageous for the threshold value Xmax to be set at a speed difference which does not cause any disturbance of gear change comfort. A threshold value Xmax of approximately 50 rpm is advantageous in that speed differences below 50 rpm cause no substantial problems for engaging the next gear, but speed differences over 50 rpm may cause problems. The threshold value Xmax may be at different speeds for different types of gearboxes and it is advantageous for the threshold value to be determined by testing for each type of gearbox.

If the control parameter Maxdip exceeds the upper permitted threshold value Xmax, the control routine goes on to step 98 which corrects the exhaust brake switch-off point to an earlier position.

If the control parameter Maxdip at interrogator step 95 is below the upper permitted threshold value Xmax, the control routine goes on instead to interrogator step 96. Step 96 does a comparison to see whether the control parameter Maxdip is below a lower permitted threshold value Xmin. It is advantageous for the threshold value Xmin to be a predetermined constant speed difference independent of the gear step and of the magnitude of the gear step. It is advantageous for the threshold value Xmin to be set at a lower speed difference which nevertheless causes a certain engine speed dip below the synchronous engine speed $n_1$. It is advantageous for the threshold value Xmin to be set at a speed difference of between 5 and 20 rpm, preferably a speed difference of 15 rpm, which produces a limited but safe torque change in the gearbox. Optimum engine speed bracketing takes place if the engine speed is reduced to at least a predetermined lower speed below the synchronous speed $n_1$, resulting in a torque change in the gearbox from a positive driving torque to a limited negative torque, which is advantageous for engaging the next gear. The threshold value Xmin may be at different speeds for different types of gearboxes and it is advantageous for the threshold value to be determined by testing for each type of gearbox. If the control parameter Maxdip is below the lower permitted threshold value Xmin, the control routine goes on to step 97, which corrects the exhaust brake switch-off point to a later switch-off position. This correction also takes place if the engine speed has not fallen below the synchronous speed for the next gear, since Dip has all the time been negative and the control parameter Maxdip has maintained its zero value set at step 90, which is below Xmin if Xmin is set at 15 rpm.

If after steps 96 and 97 have been run through, the control parameter Maxdip is found to be within the permitted range determined by Xmin and Xmax, preferably between 15 and 50 rpm, there is an optimum engine speed bracketing pattern and the control routine reverts to step 90 without correcting the exhaust brake switch-off point.

The exhaust brake switch-off point $EB_{off}$, determined as the speed difference obtained relative to the synchronous engine speed for the next gear, is normally calculated as a function of the engine speed $n_2$, the synchronous engine speed $n_1$, the speed error e, $e=n_2-n_1$, the speed error time derivative (de/dt), the vehicle's acceleration (a) and the time (EBt) when the exhaust brake is activated, so that $EB_{off}=f(n_1,n_2,e,a,EBt)$. $EB_{off}$ remains higher or increases with higher de/dt, longer EBt and higher a. Higher $EB_{off}$ results in the exhaust brake switching off earlier. A steeper derivative de/dt results in higher $EB_{off}$. If $e=n_2-n_1$, this corresponds to an increased negative derivative. The order of magnitude of EB off is within the range 60–350 rpm above the synchronous engine speed for the next gear. The exhaust brake is thus deactivated when the engine speed falls to 60–350 rpm above the synchronous speed for the next gear.

The switch-off point $EB_{off}$ is thereafter adjusted by the adaptive offset value $EBA_{off}$ obtained in the control routine above at step 97 or 98 according to whether the engine speed drop is too little or too great relative to the synchronous speed $n_1$. $EBA_{off}$ is stored in a non-volatile memory 57 in the control unit 12, which memory does not lose its contents when the voltage is switched off. $EBA_{off}$ is thereby adapted to each type of exhaust brake, relevant wear, any leakage in the exhaust brake operating cylinder, binding etc. and may be used at each upshift, including the first upshift after starting up the vehicle. No feed-back of the exhaust brake valve position is necessary, since the speed sensor of the gear change system is used for monitoring the engine-braking function of the exhaust brake.

When the vehicle is new, $EBA_{off}$ is set at zero and is thereafter altered upwards and downwards depending on the individual vehicle and the ageing of the system. To confine $EBA_{off}$ to reasonable limits, upper and lower limits for $EBA_{off}$ may be set, preferably 300 and −100 rpm respectively.

If the control parameter Maxdip exceeds the upper permitted threshold value Xmax, step 98 adjusts the exhaust brake switch-off point to an earlier switch-off position, i.e. increases the $EBA_{off}$ value. $EBA_{off}$ is set at a new value determined by the previous $EBA_{off}$, which is zero when the vehicle is new, plus a correction factor $EBA_{off}ADJ_{inc}$.

If the control parameter Maxdip falls below the lower permitted threshold value Xmin, step 97 adjusts the exhaust brake switch-off point to a later switch-off position, i.e. it reduces the $EBA_{off}$ value. $EBA_{off}$ is set at a new value determined by the previous $EBA_{off}$, which is zero when the vehicle is new, minus a correction factor $EBA_{off}ADJ_{dec}$.

The switch-off point $EB_{off}$ is thereafter adjusted by the adaptive term $EBA_{off}$ so that $EB_{off}=f(n_1,n_2,e,a,EBt)+EBA_{off}$. $EBA_{off}ADJ_{inc}$ and $EBA_{off}ADJ_{dec}$ are preferably predetermined constant steps of, for example, several tens of rpm. If quicker corrections are required, a larger step is selected, but smaller steps may be advantageous in not involving major switch-off point changes if, for example, a single recurring extreme and irregular gear change pattern is detected.

Figure 3A:
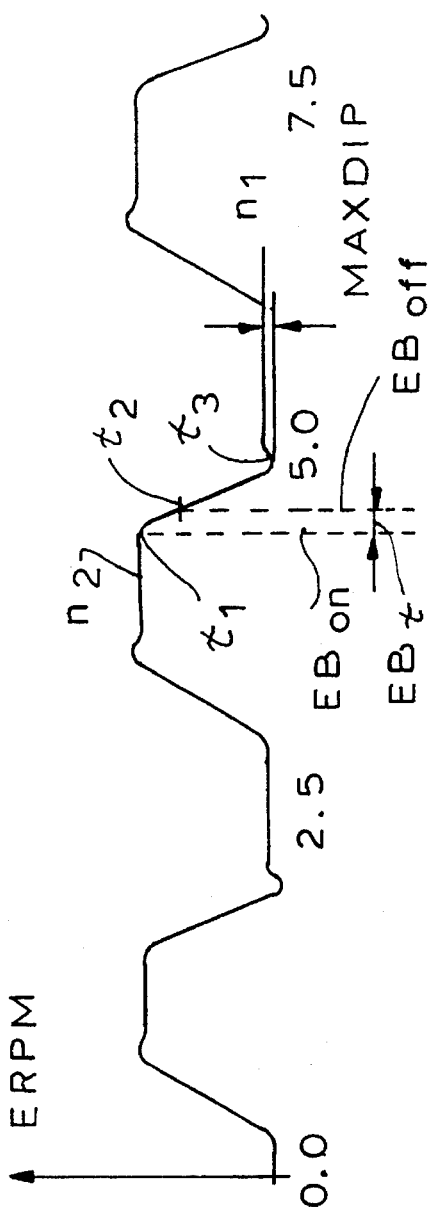
FIG. 3A and 3B show a sequence diagram in which activation of the exhaust brake causes an optimum pattern of engine speed bracketing to the synchronous speed for the next higher gear.
Figure 3B:
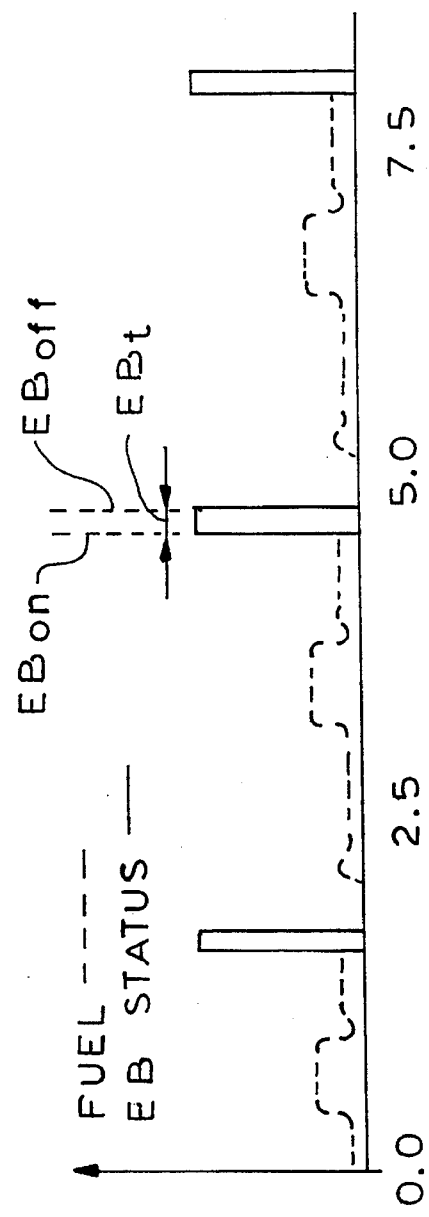
Figure 4A:
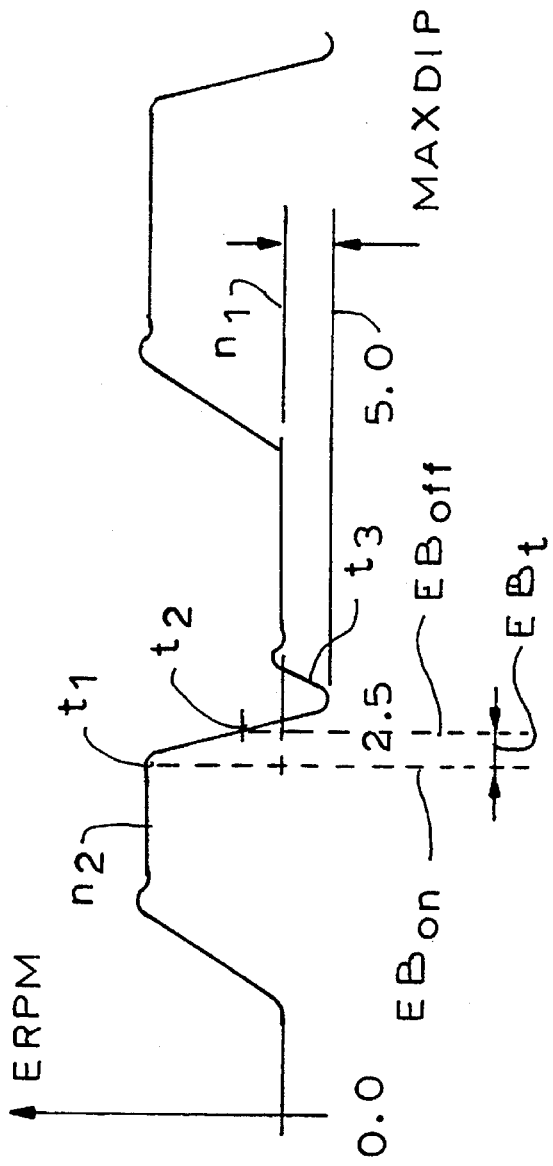
FIG. 4A and 4B show a sequence diagram in which the exhaust brake is activated too long during upshift, thereby causing the engine speed to drop substantially below the synchronous speed for the next higher gear and consequently causing problems in engaging the gear.
Figure 4B:
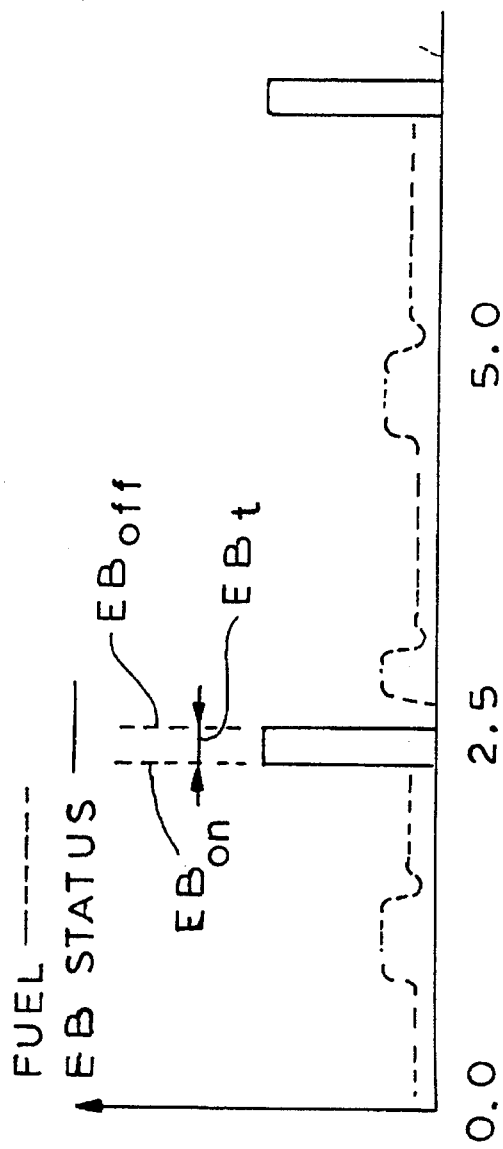

FIGS. 4A–4B depict an upshift pattern involving non optimum bracketing of engine speed to the synchronous speed for the next higher gear. The reference notations used in FIGS. 4A–4B are the same as in FIGS. 3A–3B for corresponding events. At time $t_1$ the engine has a speed ERPM which is at level $n_2$, and at that time the control unit orders an upshift. As a first measure there is adjustment of the fuel (FUEL, the broken curve in the lower part of the diagram) down to zero and the gear is disengaged, after which the exhaust brake EB is activated ($EB_{on}$). The status of the exhaust brake is depicted in the lower part of the diagram by a continuous curve either as a high signal corresponding to activated exhaust brake or as a low signal corresponding to deactivated exhaust brake. These measures thus reduce the engine speed $n_2$ quickly down to the synchronous speed $n_1$ for the next higher gear. Since a deceleration is imparted to the engine, the exhaust brake has to be deactivated ($EB_{off}$) at a time $t_2$ which occurs well before the engine speed is reduced to the synchronous speed $n_1$. If the exhaust brake has to be activated for too long a time EBt, the inertia of the deceleration torque will cause the engine speed to fall significantly below the synchronous speed $n_1$ even after the exhaust brake is deactivated. The engine speed $n_2$ will then dip below the synchronous speed $n_1$, thereby creating a significant speed difference. If this speed difference Maxdip becomes too great, this causes problems in engaging the next gear, thereby hindering, delaying and in extreme cases preventing the next higher gear engaging after time $t_3$. The problem becomes most perceptible during acceleration of heavy trucks on uphill runs where, if upshift is delayed, the vehicle speed is reduced so much during the gear change as to eliminate the need to shift to a higher gear. Switching off too early on uphill runs may result in the engine speed never catching up with the synchronous speed, which will decrease continuously because of the vehicle's retardation. This also results in gear changes being missed. There is a great risk of the system losing an upshift and trying to revert to the previous gear.

On level runs the exhaust brake switching off too late is mainly a comfort problem (smoke, noise).

FIGS. 3A–3B depict an optimum exhaust brake adjustment whereby the exhaust brake switches off at time $t_2$ so that the inertia of the deceleration torque results in the engine speed being barely reduced to a level just below the synchronous speed $n_1$. The invention described results in adaptive adjustment of the exhaust brake switch-off point for subsequent upshifts so that Maxdip, on the basis of the engine speed bracketing pattern from the previous upshift, is kept within predetermined optimum limits below the synchronous engine speed $n_1$.

Within the scope of the claims, the invention may be modified in more developed forms. $EBA_{off}ADJ_{inc}$ and $EBA_{off}ADJ_{dec}$ may alternatively be steps which are proportional to the degree to which the speed dip rises above or falls below limits predetermined by Xmax and Xmin respectively. Because of the great speed variations which occur in lower gears, $EBA_{off}ADJ_{inc}$ and $EBA_{off}ADJ_{dec}$ may be confined to adaptively correcting $EBA_{off}$ after upshifts to higher gears only. This results in better input signals, i.e. speed signals, for switch-off point correction.

A further alternative is to make $EB_{off}$ or $EBA_{off}$ temperature-dependent so as to create distinct exhaust brake switch-off points for cold and hot systems respectively.

Although the present invention has been described in relation to particular embodiment(s) thereof, many other variations and modifications and other uses will become apparent to those skilled in the art. It is preferred, therefore, that the present invention be limited by the specific disclosure herein, but only by the appended claims.

I claim:

1. A computer assisted method for controlling an upshift from a lower gear to a higher gear in a motor vehicle having an exhaust brake which is activated to lower an engine speed to a speed which is synchronized with the higher gear, which method comprises the steps of:

a) shifting from a lower gear to a higher gear;

b) activating the exhaust brake during step (a);

c) deactivating the exhaust brake during step (a) at a predetermined time after step (b);

d) determining the engine speed after step (c);

e) comparing the engine speed determined in step (d) with the synchronized speed required for the higher gear;

f) determining in accordance with predetermined criteria whether the predetermined time for deactivation of the exhaust brake for the next shift to a higher gear should be changed; and g) if step (f) indicates that the predetermined time should be changed, changing the predetermined time so that during the next shift to a higher gear the exhaust brake is deactivated at a new predetermined time.

2. A method according to claim 1, wherein the motor vehicle includes a mechanical gear box with the lower and higher gears disposed therein.

3. A method according to claim 2, wherein if the engine speed determined in step (d) is lower than the synchronized speed by a predetermined amount, the predetermined time is increased in step (g).

4. A method according to claim 3, wherein the predetermined time is increased by a predetermined value.

5. A method according to claim 2, wherein if the engine speed determined in step (d) is greater than the synchronized speed by a predetermined amount, the predetermined time is decreased in step (g).

6. A method according to claim 5, wherein the predetermined time is decreased by a predetermined value.

7. A method according to claim 5, wherein the predetermined time is decreased by an adaptive offset value ($EBA_{off}$) and the adaptive offset value is stored in a non-volatile memory.

8. A method according to claim 7, wherein the predetermined time for deactivation of the exhaust brake ($EB_{off}$) takes place in a manner dependent on engine speed as a function of at least a current engine speed ($n_2$), the synchronous engine speed for the next gear ($n_1$), a speed error time derivative ($d(n_2-n_1)/dt$), an acceleration of the vehicle (a), a time (EBt) for which the exhaust brake is activated, and the adaptive offset value ($EBA_{off}$), in such a manner that $EB_{off} = f(n_1, n_2, e, a, EBt) + EBA_{off}$.

9. A method according to claim 2, wherein the predetermined criteria are predetermined minimum and maximum limits for any difference between the engine speed determined in step (d) and the synchronized speed.

10. A method according to claim 9, wherein the predetermined time is not changed if the difference between the engine speed and the synchronized speed is between the minimum and maximum limits.

11. A method according to claim 10, wherein the predetermined limits are fixed values independent of the lower and higher gears and the predetermined limits are between about 15 rpm and 50 rpm below the synchronized speed for the higher bear.

12. A computer assisted arrangement for controlling an upshift from a lower gear to a higher gear in a motor vehicle having an exhaust brake which is activated to lower an engine speed to a speed which is synchronized with the higher gear, which arrangement comprises:

a) means for shifting from a lower gear to a higher gear;

b) means for activating the exhaust brake during shifting;

c) means for deactivating the exhaust brake during shifting at a predetermined time after activation;

(d) first means for determining the engine speed after deactivation of the exhaust brake;

(e) means for comparing the determined engine speed with the synchronized speed required for the higher gear;

(f) second determining means for determining in accordance with predetermined criteria whether the predetermined time for deactivation of the exhaust brake for the next shift to a higher gear should be changed; and (g) means for changing the predetermined time so that during the next shift to a higher gear the exhaust brake is deactivated at a new predetermined time if the second determines means determining that the predetermined time should be changed.

* * * * *